United States Patent [19]

Sugiura

[11] Patent Number: 4,939,541
[45] Date of Patent: Jul. 3, 1990

[54] IMAGE FORMING APPARATUS
[75] Inventor: Mitsushi Sugiura, Osaka, Japan
[73] Assignee: Minolta Camera Kabushiki Kaisha, Osaka, Japan
[21] Appl. No.: 336,237
[22] Filed: Apr. 11, 1989

[30] Foreign Application Priority Data

| Apr. 13, 1988 | [JP] | Japan | 63-90742 |
| Apr. 25, 1988 | [JP] | Japan | 63-103431 |
| Apr. 25, 1988 | [JP] | Japan | 63-103432 |
| Apr. 25, 1988 | [JP] | Japan | 63-103433 |
| Apr. 25, 1988 | [JP] | Japan | 63-103434 |
| Apr. 25, 1988 | [JP] | Japan | 63-103435 |

[51] Int. Cl.$^5$ .................................. G03G 15/00
[52] U.S. Cl. ................... 355/202; 355/210; 346/76 PH
[58] Field of Search .......... 355/200, 202, 210; 346/76 PH

[56] References Cited

U.S. PATENT DOCUMENTS

| 4,270,856 | 6/1981 | Goida | 355/200 |
| 4,562,444 | 12/1985 | Nagashima et al. | 346/76 PH |
| 4,605,299 | 8/1986 | Mochimaru | 355/200 |
| 4,627,701 | 12/1986 | Onoda et al. | 355/3 CH |
| 4,627,703 | 12/1986 | Suzuki et al. | 355/3 R |
| 4,697,913 | 10/1987 | Kuramoto et al. | 355/3 R |
| 4,803,521 | 2/1989 | Honda | 355/210 X |

FOREIGN PATENT DOCUMENTS 62-40471  2/1987  Japan .................................. 355/210

*Primary Examiner*—R. L. Moses
*Attorney, Agent, or Firm*—Willian Brinks Olds Hofer Gilson & Lione

[57] ABSTRACT

An image forming apparatus allowing a main assembly thereof to be interchangeably loaded with a first unit and a second unit. The first unit cooperates with a mechanism disposed in the main assembly to copy an image of a given document by the electrophotographic copying process. The second unit cooperates with a mechanism disposed in the main assembly to reproduce an image on a paper by the thermal transfer printing process. When image data from a facsimile or a word processor are transmitted to a thermal head in the second unit, an image can be reproduced on the paper based on the image data.

14 Claims, 14 Drawing Sheets

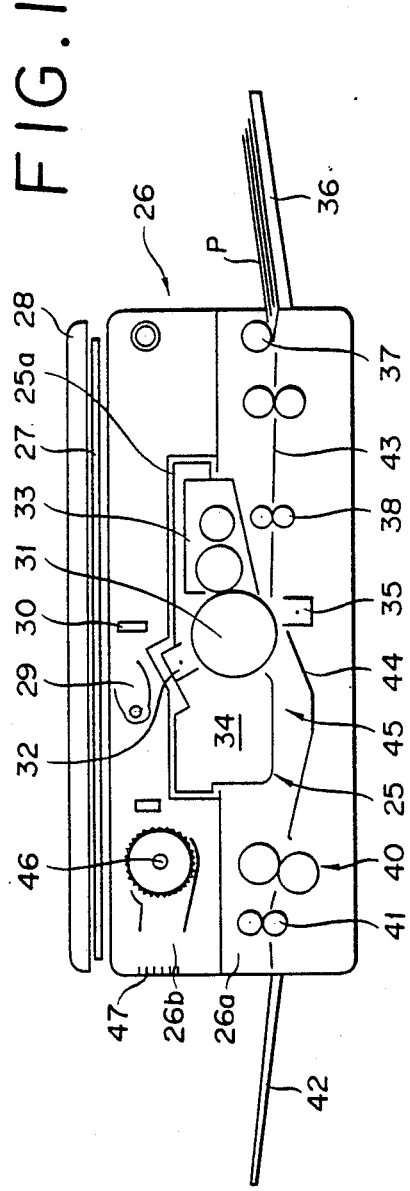
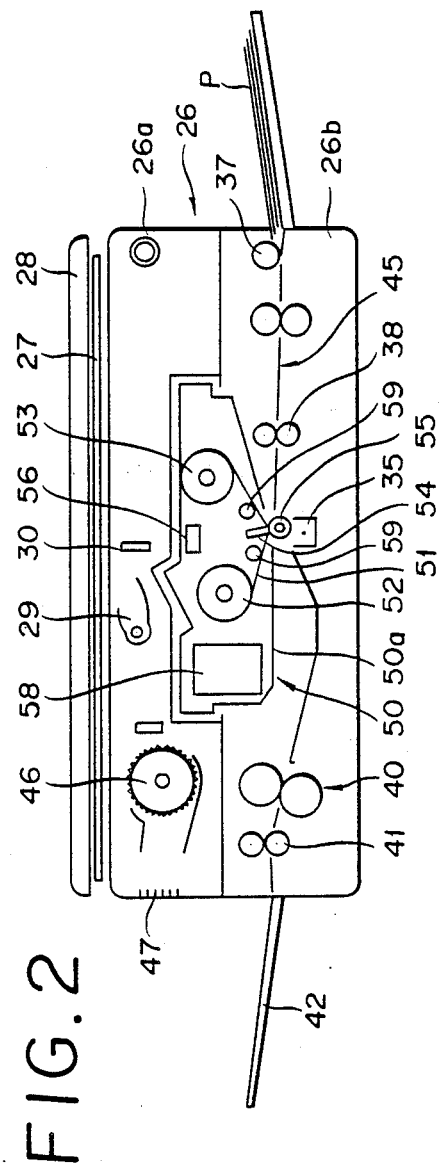
FIG.1
FIG.2

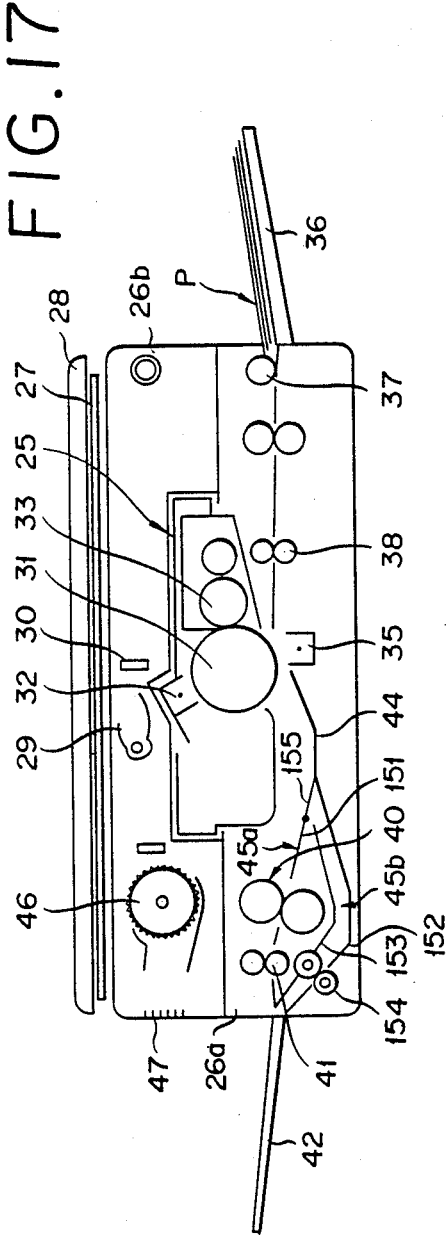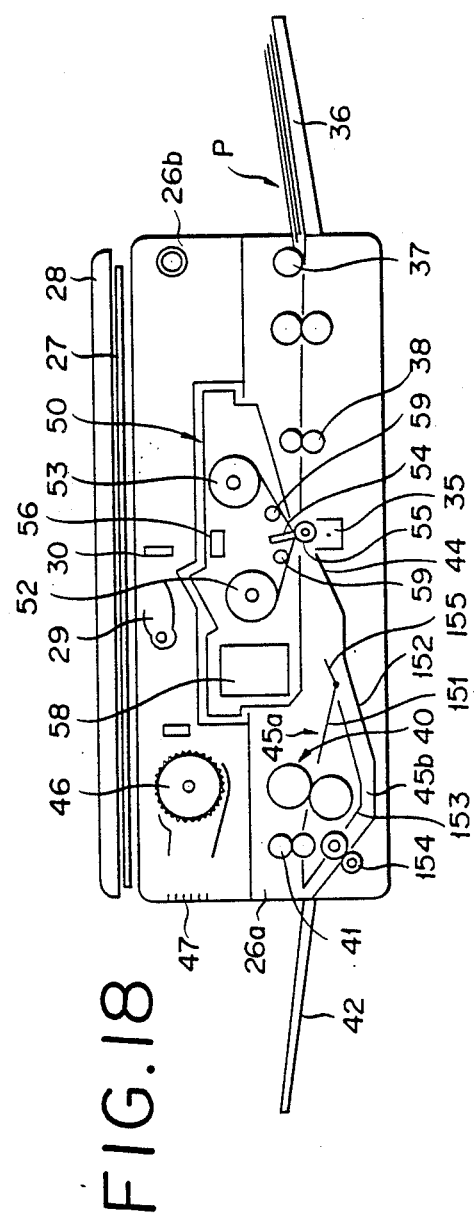

IMAGE FORMING APPARATUS

BACKGROUND OF THE INVENTION

1. Field of the Invention

This invention relates to an image forming apparatus and more particularly to an image forming apparatus provided interchageably with a first unit for analogously forming an image by the electrophotographic copying process and a second unit for digitally forming an image by the thermal transfer printing process.

2. Description of the Related Arts

The concept of using a casing integrally incorporating therein a photosensitive member, a developing device, etc. as a unit and detachably fitting this unit inside a copying machine for the purpose of facilitating and conveniencing the maintenance, management, and repair of the copying machine has found recognition (for example, U.S. Pat. No. 4,627,701). Electrophotographic copying machines adopting this concept are now in popular use.

Today, in consequence of the growth of electronic devices, the practice of filing image data in the form of digital signals has been steadily disseminating and has come to urge the necessity for a printer which is capable of producing an image in response to a digital signal. When a printer capable of converting digital signals into images and an image reader capable of optically reading an original and generating a digital signal in response thereto are combined, the product of this combination offers the convenience that the printer can be additionally used as a copying machine. In cases where an image of a given document to be copied must be converted into digital signals in advance of the copying treatment, it is difficult to attain faithful reproduction of the image of the document. An attempt at attaining the faithful reproduction turns out to be a task in need of exceptionally high technique and immense cost.

SUMMARY OF THE INVENTION

An object of this invention is to provide an image forming apparatus which combines the analog copying function of the electrophotographic copying process excelling in reproducibility and the digital printing function by the thermal transfer printing process advantageous in terms of a running cost.

Another object of this invention is to provide an image forming apparatus which allows a first unit possessing the analog copying function and a second unit possessing the digital printing function to be interchangeably installed in a common main assembly.

Yet another object of this invention is to provide an image forming apparatus which is possessed of the second unit for reproducing an image on a paper of the thermal transfer printing process, based on the image data received from an external device such as word processor, facsimile, or video deck.

Yet further object of this invention is to provide an image forming apparatus which is possessed of a moving member for moving to and fixing at prescribed positions, depending on the kinds of the unit installed in the apparatus, a transfer charger capable of transferring onto plain paper a toner image adhering to a photosensitive member in the first unit in cooperation with the photosensitive member and a platen roller for depressing a thermal heat in the second unit.

Still another object of this invention is to provide an image forming apparatus which is configured so that a heater used in a fixing device incorporated in the main assembly remains inactive while the second unit is set in an operating position in the apparatus.

Another object of this invention is to provide an image forming apparatus which is provided with a first paper transport path for guiding a paper via a fixing device to a paper discharge tray while the first unit is set in an operating position and a second paper transport path for guiding a paper directly to the paper discharge tray by detouring the fixing device while the second unit is set in an operating position.

In accordance with one aspect of the present invention, there is provided an image forming apparatus, comprising: a main assembly incorporating therein a paper transport mechanism for transporting a paper, a first unit and a second unit interchangeably set in place in the main assembly, the first unit including a photosensitive member and a processing device for copying an image on the paper by the electrophotographic copying process and the second unit including a thermal head and an ink ribbon transport device for transporting an ink ribbon carrying an ink thereon, wherein the formation of an image on the paper is effected by the first unit using the electrophotographic copying process or by the second unit using thermal transfer printing process resorting to the thermal head and the ink ribbon.

BRIEF DESCRIPTION OF THE DRAWINGS

FIG. 1 is a front view illustrating in schema the internal structure of an image forming apparatus of this invention in a state having the first unit set in an operating position.

FIG. 2 is a front view illustrating in schema the internal structure of the image forming apparatus of this invention in a state having the second unit set in an operating position.

FIG. 13 is a schematic front view illustrating a typical image forming apparatus as another embodiment of this invention in a state loaded with the first unit.

FIG. 14 is a schematic diagram illustrating the main body of the apparatus shown in FIG. 14 in a state loaded with the second unit.

FIG. 17 is a schematic front view illustrating a typical image forming apparatus as yet another embodiment of this invention, in a state loaded with the first unit.

FIG. 18 is a schematic front view illustrating the image forming apparatus of FIG. 17 in a state having the second unit set in an operating position.

DETAILED DESCRIPTION OF THE PREFERRED EMBODIMENTS

Figure 3:
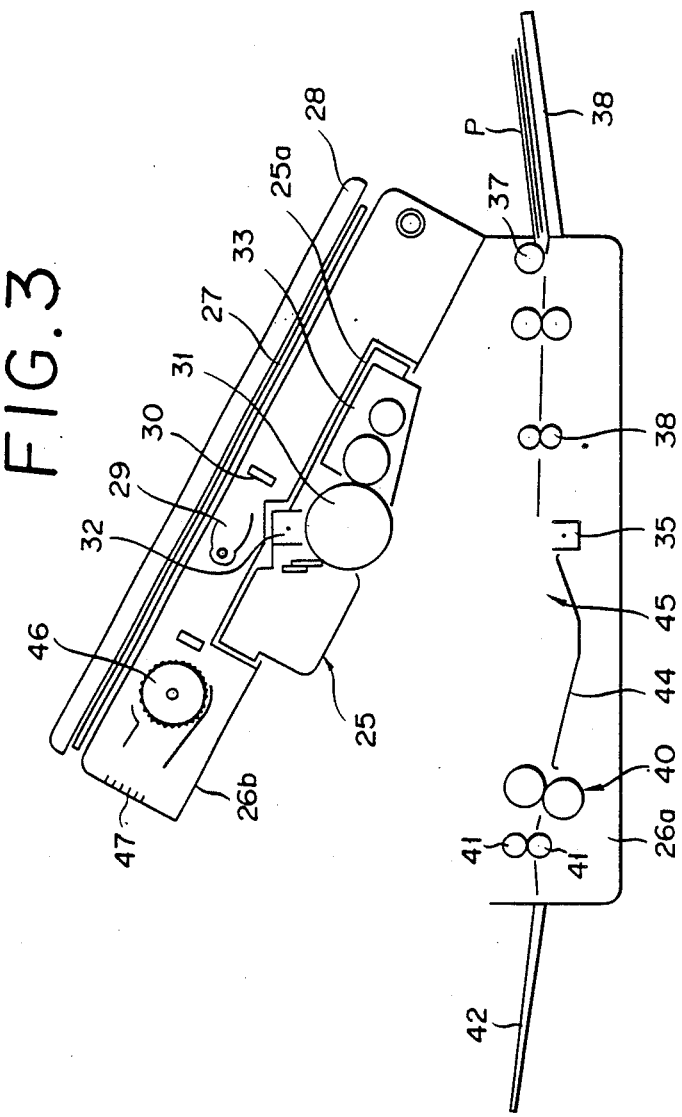
FIG. 3 is a schematic diagram illustrating the image forming apparatus in a state having the first unit set in an operating position after the upper main body held in a closed state as illustrated in FIG. 1 has been changed to an open state.

FIG. 1 to FIG. 3 are diagrams illustrating the whole structure of a typical image forming apparatus as one embodiment of this invention. The main body of the apparatus, namely a main assembly 26 comprises a lower body 26a and an upper body 26b adapted to be rotated about the terminal part of the lower body. The lower central part of the upper body 26b is adapted to accommodate therein a first unit 25 in a detachable manner. This first unit 25 is set in place by being pushed in the direction prependicular to the surface of the drawing and removed by being pulled out.

The image forming apparatus in the state having the first unit 25 set in an operating position is enabled to effect analog reproduction of an image recorded in a given document on a paper by the electrophotographic copying process. To support the document, a document stand 27 made of glass is mounted bilaterally movably on the upper body 26b. A cover 28 for covering the document stand is attached to the document stand in such a manner as to be opened and closed relative thereto. A light source 29 for illuminating the document laid on the document stand 27 and a lens array 30 for converging and transmitting the light reflected from the document toward the first unit 25 are installed inside the upper body 26b.

Inside a unit case 25a of the first unit 25, a photosensitive drum 31 is rotatably set in place. This photosensitive drum 31 is so adapted that the light from the lens array 30 is projected on the outer peripheral surface to form an electrostatic latent image. An electric charger 32 for uniformly charging the surface of the photosensitive drum 31 before the projection of the light from the lens array 30 is disposed inside the unit case 25a. Further, a developing device 33 for depositing a toner on the electrostatic latent image and a cleaner 34 for removing the residual toner from the outer peripheral surface of the photosensitive drum 31 after the transfer of the toner image to the paper are disposed inside the unit case 25a.

The lower body 26a is provided at the position thereof opposed to the photosensitive drum 31 with a transfer charger 35 for transferring the toner adhering to the photosensitive drum 31 to the paper. To the right terminal part of the lower body 26a, a paper feed tray 36 for supporting a plurality of papers P in a pile is detachably attached. The papers on the paper feed tray 36 are sent out one by one by a supply roller 37. A timing roller 38 for conveying the paper to the gap between the photosensitive drum 31 and the transfer charger 35 as synchronized with the rotation of the photosensitive drum 31 is attached to the lower body 26b. A fixing device 40 for causing the toner image transferred onto the paper to be thermally fused on the paper is disposed inside the lower body 26a on the downstream side on the transfer charger 35 in the direction of the conveyance of the paper and a pair of discharge rollers 41 for discharging the paper on which the toner image has been fixed are disposed also inside the lower body 26a on the downstream side of the fixing device. A discharge tray 42 for receiving the discharged paper is detachably attached to the left terminal part of the lower body 26a.

A guide plate 43 for guiding the paper P yet to have an image formed thereon is interposed between the supply roller 37 and the transfer charger 35. Another guide plate 44 for guiding the paper having a toner image already transferred thereto is interposed between the transfer charger 35 and the discharge tray 42. These guide plates 43, 44 jointly form a paper transfer path 45.

In the left terminal part of the interior of the upper body 26b, an exhaust fan 46 is disposed above the fixing device 40. When this exhaust fan 46 is rotated by a motor (not shown), the waste heat and ozone generated by the fixing device 40 and other parts incorporated inside the body 26 are released through a blower outlet 47 into the ambient air.

When the image of the document mounted on the glass document stand 27 is copied on the paper by the use of the apparatus in the state having the first unit 25 in the operating position as illustrated in FIG. 1, the surface of the photosensitive drum 31 is uniformly charged by the electric charger 32 in consequence of the rotation of the photosensitive drum 31. Then, on the surface of the photosensitive drum 31, the light from the lens array 30 forms an electtrostatic latent image corresponding to the image of the document. This electrostatic latent image is converted into a toner image by the developing device 33. After this toner is transferred onto the paper P supplied from the paper supply tray 36, it is thermally fixed by the fixing device 40. The paper on which the image has been formed as described above is fed out onto the discharge tray 42.

In the image forming apparatus of this embodiment, since the unit 25 is adapted to be detachably set in place inside the body 26 of the apparatus, the color of the image to be formed on the paper can be changed by replacing the first unit 25 using the toner in black color with another unit using the toner in a color other than black. Optionally this change of the color of the image may be attained by replacing the developing device 33 with a developing device 33 using such other color as mentioned above instead of replacing the unit wholly.

FIG. 2 illustrates the image forming apparatus having a second unit incorporated in the main body 26 thereof in the place of the first unit 25 illustrated in FIG. 1. Thus, the main assembly or the main body 26 of the image forming apparatus is constructed in such a manner as to permit interchangeable accommodation therein of the first unit 25 and the second unit 50. The second unit 50 is a thermal transfer unit for digitally forming an image by the thermal transfer printing process. It has incorporated in a unit case 50a thereof an ink supply reel 52 having an ink ribbon 51, i.e. a strip of ink film coated with thermally fusible ink, wound round thereon in the form of a roll and a takeup reel 53 for rewinding the ink ribbon thereon. A thermal head 54 is set in place inside the unit case 50a as interposed between the reels 52, 53. A platen roller 55 to be depressed against the thermal head 54 is attached to the unit case 50a. Further, the unit case 50a is provided therein with an image reader 56 which is disposed below the lens array 30. This image reader 56 is formed of such light-receiving elements as CCD (charge coupled device). The light-receiving surface of the image reader 56 coincides with the focal piont of the lens array 30. The unit case 50a is provided therein with a control part 58 for controlling the operation of each of the members installed in the unit case. For the purpose of guiding the ink ribbon 51 paid out of the supply reel 52 to the takeup reel 53, the second unit 50 is provided therein with a guide roll 59.

To reproduce the image of the document mounted on the document stand 27 by the use of the image forming apparatus loaded with the second unit 50, the image reader 56 reads the light from the lens array 30, transmits digital signals modulated in conformity with the image to the thermal head 54 through the medium of the control part 58, and effects transfer of the ink of the ink ribbon 51 onto the paper from the supply tray 36. During this transfer of the image, the paper is passed between the platen roller 55 and the ink ribbon 51.

Figure 4:
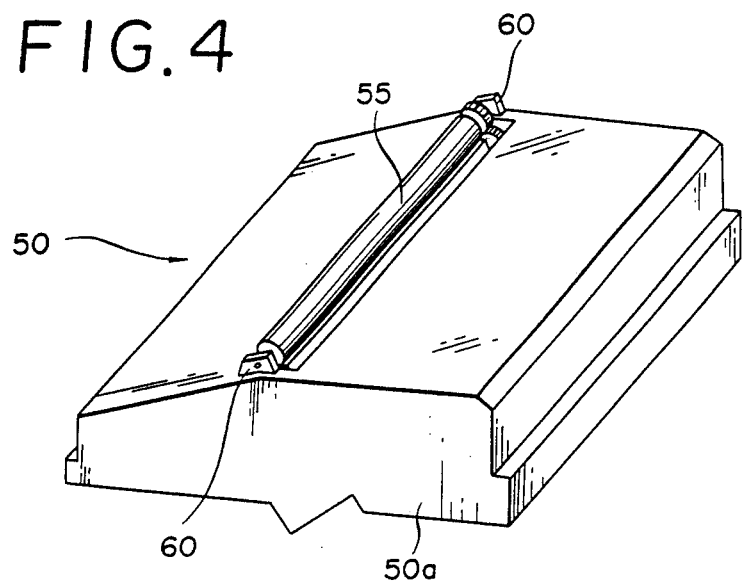
FIG. 4 is a perspective view illustrating the second unit shown in FIG. 2 as seen from the bottom side.

FIG. 4 is a diagram illustrating the bottom side of the second unit 50. The platen roller 55 mentioned above is rotatably supported on brackets projected from the lower side of the unit case 50a. This platen roller 55 protrudes from the unit case 50a. To prevent the platen roller 55 and the transfer charger 35 from interfering with each other during the installation of the second unit 50 inside the main body 26 of the image forming apparatus, the transfer charger 35 is adapted to be moved freely in the vertical direction. A spring member (not shown) exerts a constant upward resilient force on this transfer charger 35. When the second unit case 50 is set in place within the main body 26 of the image forming apparatus, therefore, the platen roller 55 depresses the transfer charger 35 to a retracted position.

Figure 5:
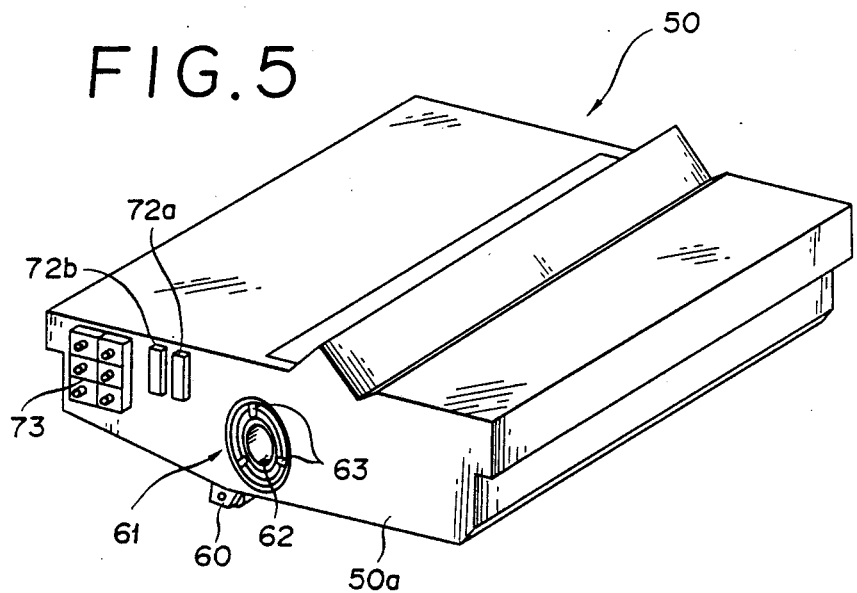
FIG. 5 is a perspective view illustrating the second unit shown in FIG. 2 as seen from the front side.
Figure 6:
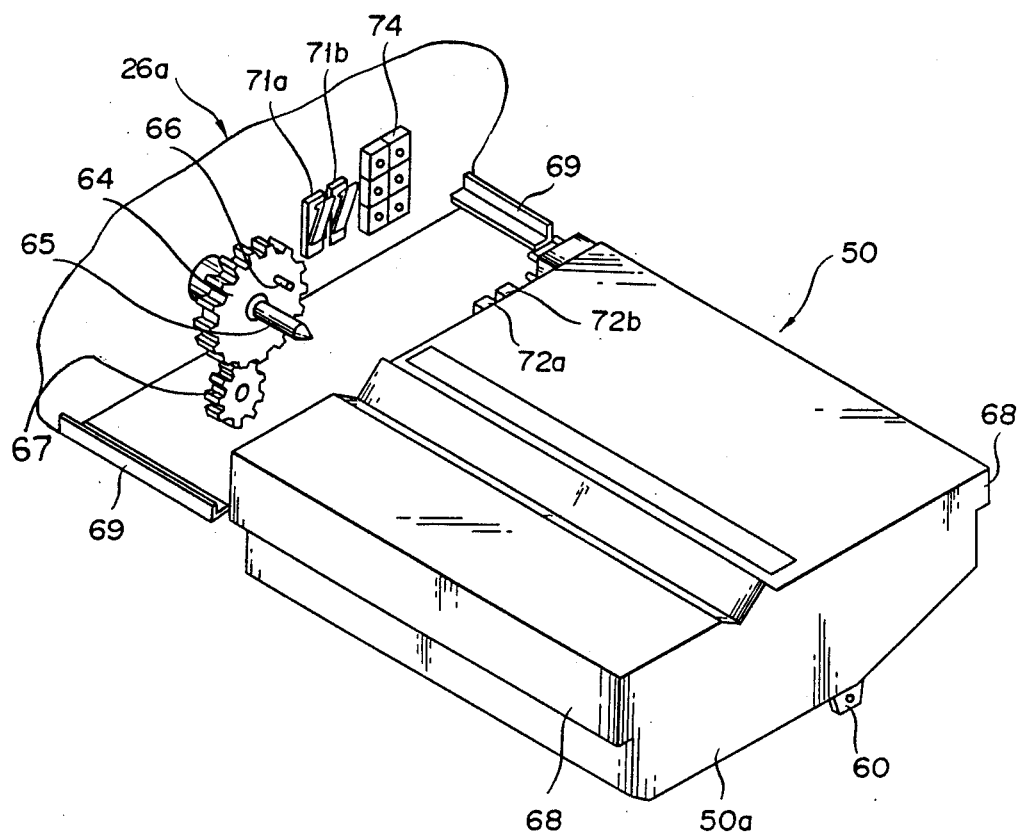
FIG. 6 is a perspective view of the second unit shown in FIG. 2 as seen in the direction of the left side thereof.

FIG. 5 illustrates the rear side of the second unit 50 and FIG. 6 the front side of the second unit 50 and part of the upper body 26b. Inside the unit case 50a, a rotary member 61 connected to the takeup reel 53 is rotatably installed as illustrated in FIG. 5. On this rotary member 61, a shaft hole 62 and a plurality of pin receptacles 63 are formed in the rotary member 61 as exposed on the outside of the case 50a. In the upper body 26b, a rod 65 for insertion into the shaft hole 62 mentioned above and a pin 66 for insertion into othe pin receptacle 63 are projected from a toothed wheel 64 as illustrated in FIG. 6. A toothed wheel 67 on the driving side connected to a motor not shown) is meshed with the toothed wheel 64. In the image forming apparatus having the second unit set in place in the main body thereof, this motor imparts a rotation to the takeup reel 53 through the medium of the toothed wheels 67, 64 and the rotary member 61. A guide rail 69 for supporting projected parts 68 formed one each at the bilateral terminal parts of the second unit case 50a during the installation of the second unit 50 in the upper body 26b is disposed inside the upper body 26b.

The upper body 26b, as illustrated in FIG. 6 incorporates therein two microswitches 71a, 71b for discerning whether the upper body 26b is loaded with the first unit 25 or with the second unit 50. On the rear side of the second unit case 50a, projections 72a, 72b for actuating the microswitches 71a, 71b are optionally fixed at the positions opposite these microswitches 71a, 71b. By the fact that either of the two microswitches is actuated or both of them are actuated, a decision can be made as to which of two units 25, 50 is installed in the main assembly.

To the rear side of the unit case 50 is attached a connector 73 provided with a plurality of electroconductive terminals. Inside the upper body 26b, a connector 74 provided with a plurality of connection sockets is attached at the position destined to confront the connector 73. It is via these connectors that an image signal from an external device can be transferred to the thermal head 54 where the second unit 50 is installed or the control signal is transmitted to the electric charger 32, the developing device, etc. where the first unit 25 is installed. The aforementioned rotary member 61 and the connector 73 are incorporated also on the rear side of the first unit 25.

The fixing device 40 mentioned above is provided, as illustrated in FIG. 1, with an upper roller 76 and a lower roller 77. Where the first unit 25 is used and the photosensitive drum 31 is relied on to form the image on the paper, the heat of the heater lamp incorporated in the upper roller 76 fixes the toner image on the paper and the pressing force required to be applied to the paper for the purpose of the fixation of the image is furnished by the two rollers 76, 77. In contrast, where the second unit 50 is used and the thermal head 54 is relied on to effect thermal transfer of the image onto the paper, it is necessary that the paper should be prevented from being heated and, at the same time, the pressing force generated by the two rollers 76, 77 should be decreased or nullified.

Figure 7:
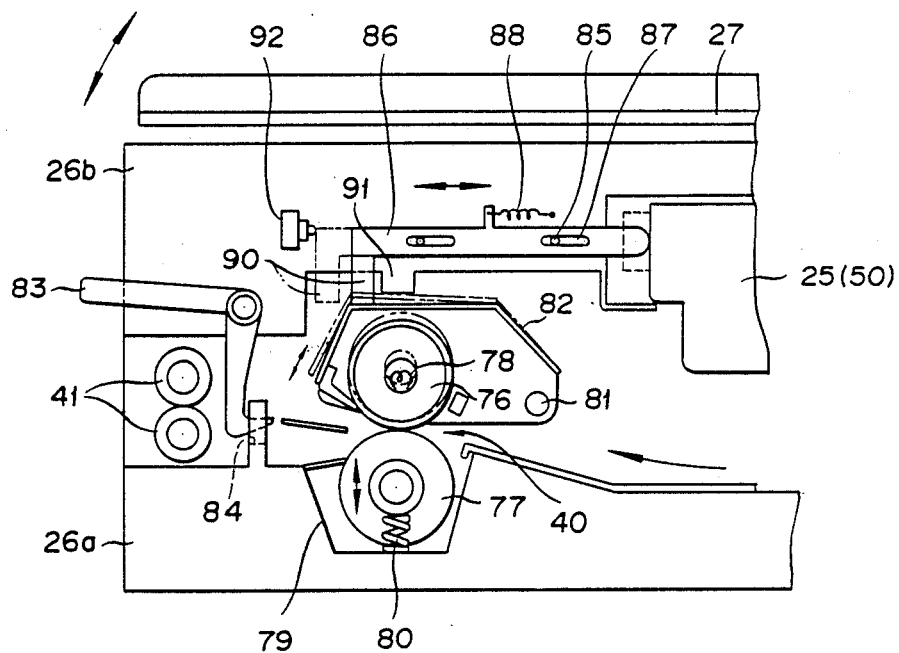
FIG. 7 is a magnified front view of the part of the fixing device shown in FIG. 1 and FIG. 2.
Figure 8:
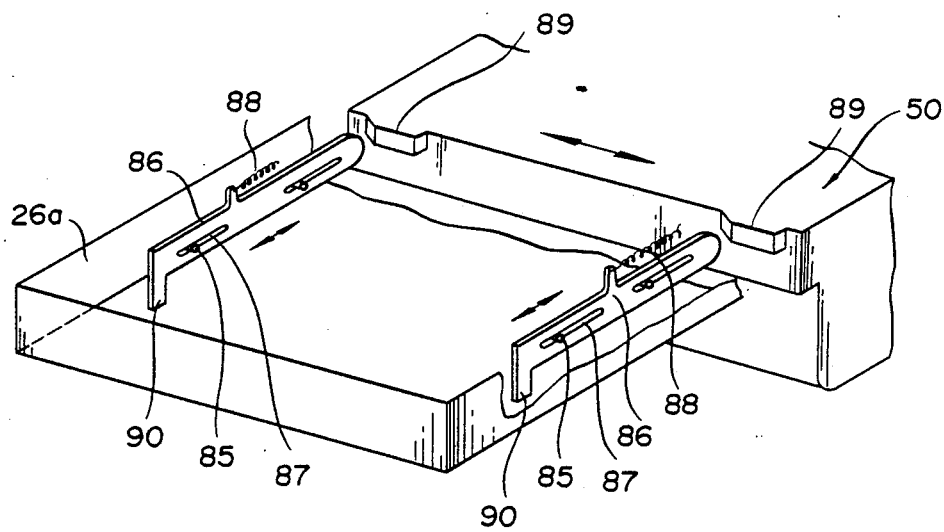
FIG. 8 is a perspective view of the part of the lower body to which the lever shown in FIG. 7 is attached.

FIG. 7 and FIG. 8 illustrate a mechanism for selectively effecting the adjustment of the pressing force exerted by the two rollers 76, 77 upon the paper, depending on the choice between the first unit 25 and the second unit 50 to be incorporated in the main assembly.

The lower roller 77 is attached rotatably and movably in the vertical direction indicated by the arrow to a frame 79 fixed inside the lower body 26a. A compressive coil spring 80 attached to the frame 79 exerts a resilient force tending upwardly upon the lower roller 77. To a supporting pin 81 fixed inside the lower body 26a, a frame 82 is attached swingably around the supporting pin 81. To this frame 82, the aforementioned upper roller 76 is rotatably attached.

To the upper body 26b, two levers 86 are attached slidably in the horizontal direction above the fixing device 40 by means of guide pins 85 fixed to the upper body 26b. The levers 86 are allowed to produce a sliding motion within the length of oblong holes 87 which are formed therein and in which the guide pins 85 are kept in engagement. A tensile coil spring 88 generates a resilient force tending toward the aforementioned units 25, 50 to be exerted upon the levers 86. The second unit 50 is provided in the case 50a thereof, as illustrated in FIG. 8, with cams 89 adapted to be meshed with the leading ends of the levers 86. When the second unit 50 is set in place within the upper body 26b, the levers 86 are retracted to the position indicated by an imaginary line in FIG. 7. The levers 86 are provided at the rear end parts thereof with projecting parts 90 directed downwardly. These projecting parts 90 do not contact the frame 82 when the main assembly is loaded with the second unit 50. In contrast, since the first unit 25 is not provided with the aforementioned cams 89, when the main assembly is loaded with the first unit 25, the projecting parts 90 of these levers 86 contact the frame 82 as indicated by a solid line in FIG. 7.

When the upper body 26b with the first unit 25 is in a closed state, in which the leading end of a lock lever 83 swingably disposed on the upper body 26b is brought into engagment with lock hole 84 formed in the lower body 26a, therefore, the frame 82 and the upper roller 76 are lowered by the projecting parts 90 to the position indicated by the solid line. Depending on this position, the lower roller 77 is also lowered and the coil spring 80 is contracted. As the result, the two rollers 76, 77 exert a pressing force necessary for the fixation of the toner, generally in the range of 6 to 20 kg., upon the paper.

The upper body 26b is provided with a projecting part 91 which has a lower end face at a position deviating upwardly from the position of the lower end face of the projecting part 90 of the lever 86. When the main assembly is loaded with the second unit 50, the levers 86 are retracted by the cams 89 and the projecting parts 90 of the rear end parts are retracted from above the frame 82. When the upper body 26b with the second unit 50 is in the closed state, the frame 82 comes into contact with the projecting parts 91 and fixed at the position indicated by an imaginary line in FIG. 7. The pressing force exerted jointly by the rollers 76, 77 on the paper may be smaller than the pressing force necessary for the fixation of the toner image and must be enough for the conveyance of the paper. Generally, it is set in the neighborhood of 100 g. Where the main assembly is loaded with the second unit 50 and these rollers 76, 77 are not relied on to convey the paper, the upper roller 76 may be separated from the lower roller 77 by rotating the frame 82 clockwise.

When the main assembly is loaded with the second unit 50, since the fixing device is not required to heat the paper, a microswitch 92 actuated by the lever 86 is disposed in the upper body 26b for the purpose of turning off the heater lamp 78 which is incorporated in the upper roller 76. As the result, when the main assembly is loaded with the second unit 50, the lever 86 is moved to the position indicated by an imaginary line in FIG. 7 and the microswitch 92 is actuated and the heater lamp 78 is automatically turned off.

Figure 9:
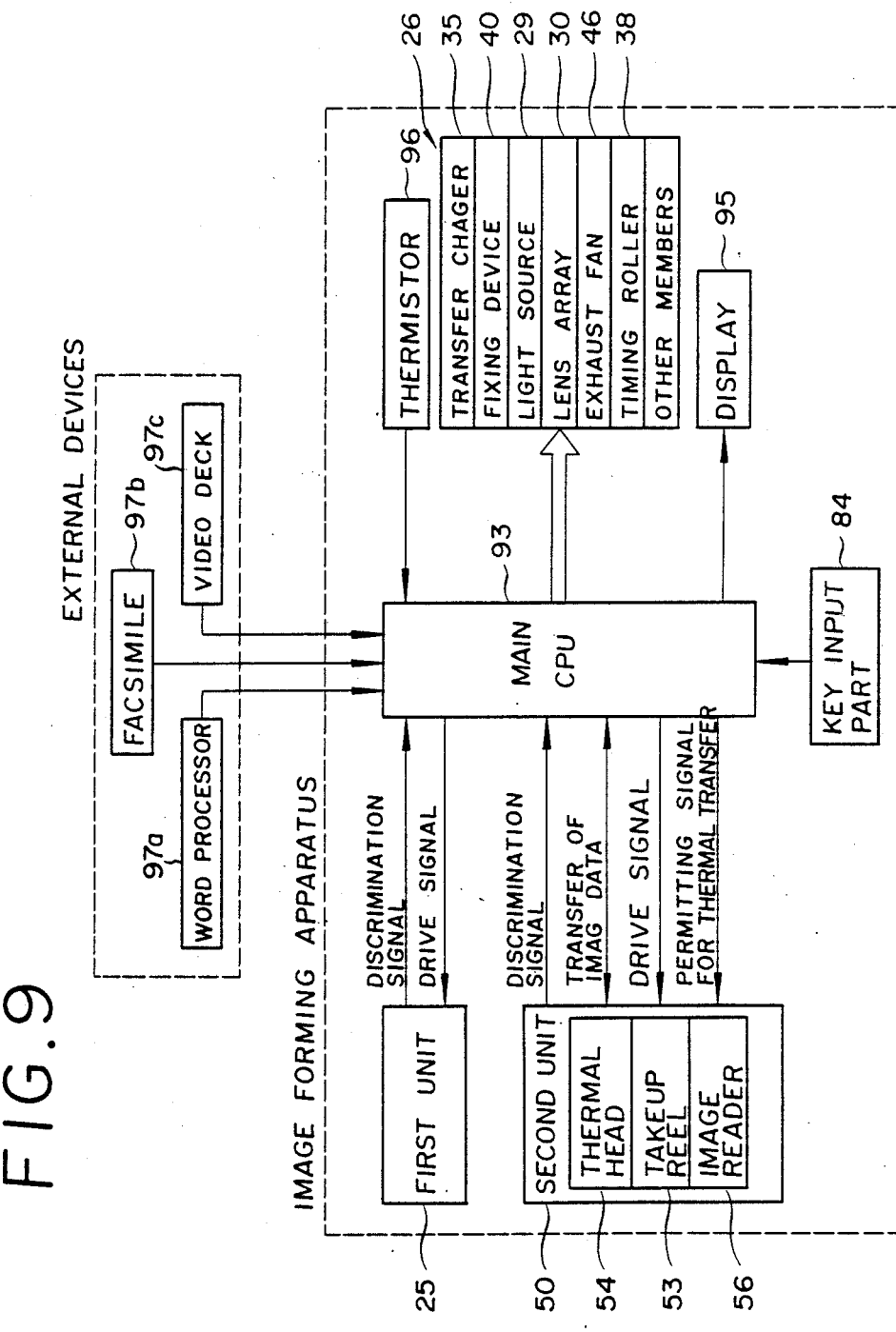
FIG. 9 is a block diagram showing the control circuit for the image forming apparatus of the present invention.

FIG. 9 is a block diagram illustrating a control circuit for the image forming apparatus. To a main CPU 93 installed in the main body 26 of the image forming apparatus, the discrimination signal issued by the microswitches 71a and 71b to indicate that whether the main body 26 is loaded with the first unit 25 for reproducing an image by the electrophotographic copying process or the second unit 50 for printing an image with a thermal head based on a digital image signal on the paper is transmitted. When the main body is loaded with the first unit 25, the CPU 93 issues a drive signal to the electric charger 32 and other members installed inside the unit 25. When the main body is loaded with the second unit 50, the CPU 93 issues a motor drive signal for controlling a motor (not shown) which rotates the takeup reel 53 inside the unit 50 and a permitting signal for permitting the thermal transfer operation.

Further to the CPU 93, the input data such as the number of copies to be produced which the operator has selected for the operation of the image forming apparatus and introduced through the key input part 84 installed on the operation board are forwarded. Such input data as the number of copies which have been introduced in consequence cf the procedure mentioned above are exhibited on a display part 95. The CPU 93 issues control signals to the light source 29, the lens array 30, the timing roller 38, the exhaust fan 46, the fixing device 30, and other members incorporated in the main body 26. For the detection of the temperature of the fixing device 40, a thermistor 96 is installed as a temperature sensor as illustrate in FIG. 9. In the illustrated embodiment, the control part 58 installed within the second unit 50 is depicted as discharging the role of controlling the printing operation. Optionally, the CPU 93 may be configured so as to effect &:his control additionally.

The CPU 93 has an interface for permitting connection of external devices. Thus, image data signals from these external devices may be utilized for forming images on the paper by the thermal transfer printing process. The external devices include a word processor 97a, a facsimile 97b, and a video deck 97c, for example, as illustrated in FIG. 9. It is further permissible to transmit image data from the image reader 56 in the second unit to the printer of the word processor 97a or the facsimile 97b and enable the printer to effect the reproduction cf the image.

Though the illustrated second unit 50 of this embodiment is provided with the image reader 56 for reading a image of a given document mounted on the document stand 27, the second unit 50 may have no image reader. In this case, an image corresponding to a digital image signal from each of the external devices is reproduced on the paper by the thermal transfer printing process.

Figure 10:
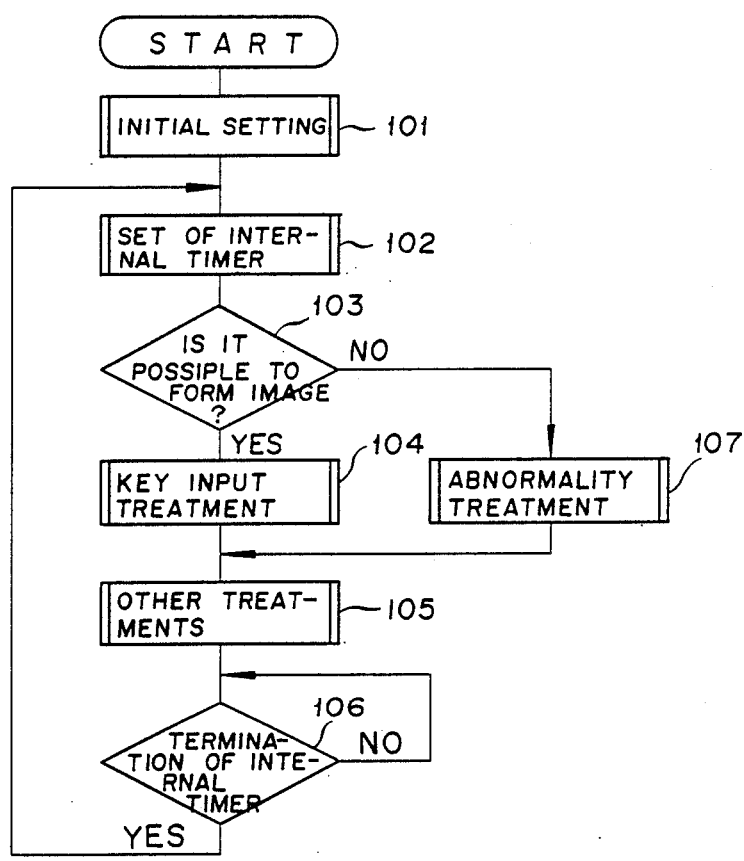
FIG. 10 is a main flow chart illustrating procedure for the operation of this invention.
Figure 11:
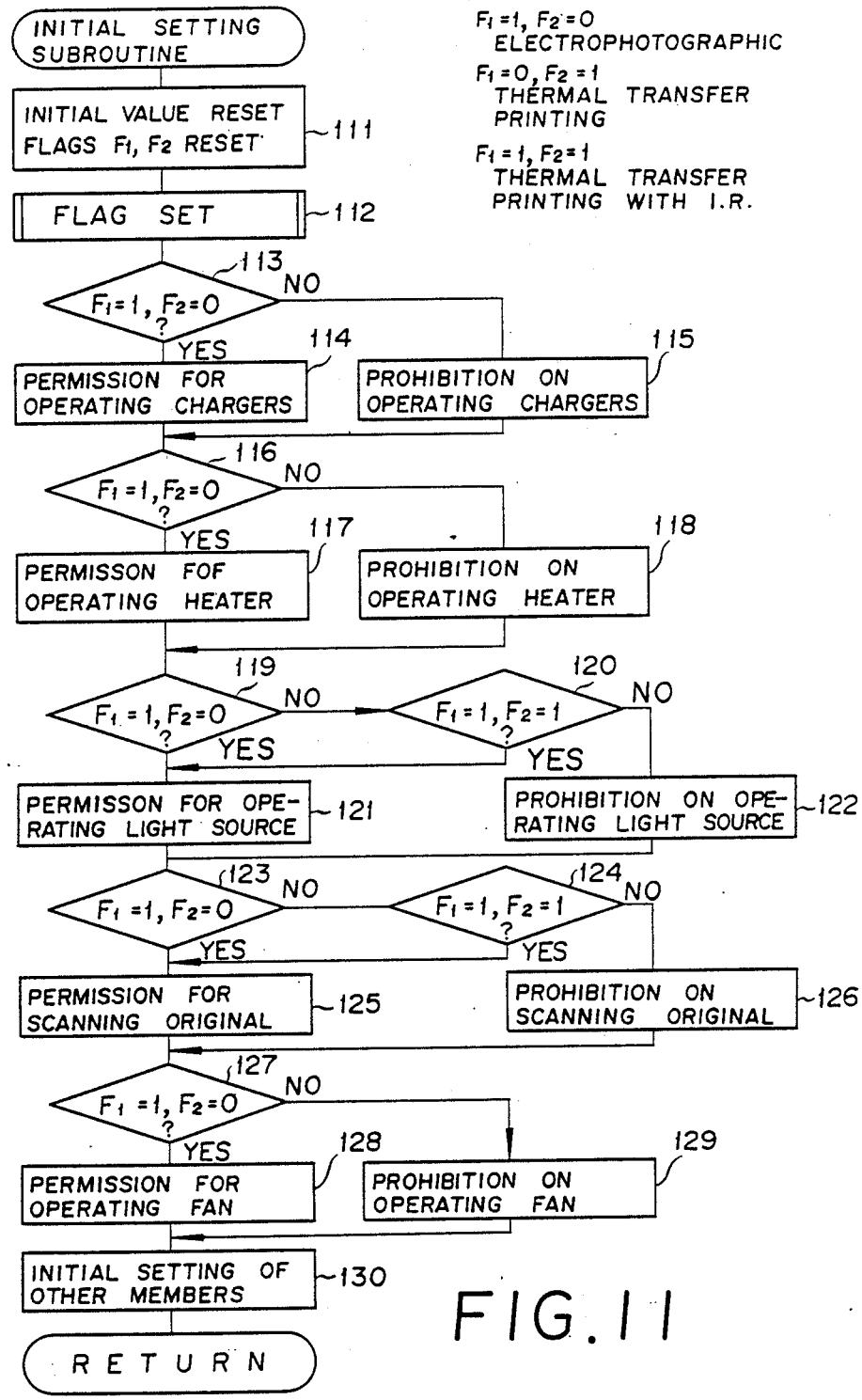
FIG. 11 is a flow chart illustrating in detail the initial subroutine shown in FIG. 10.
Figure 12:
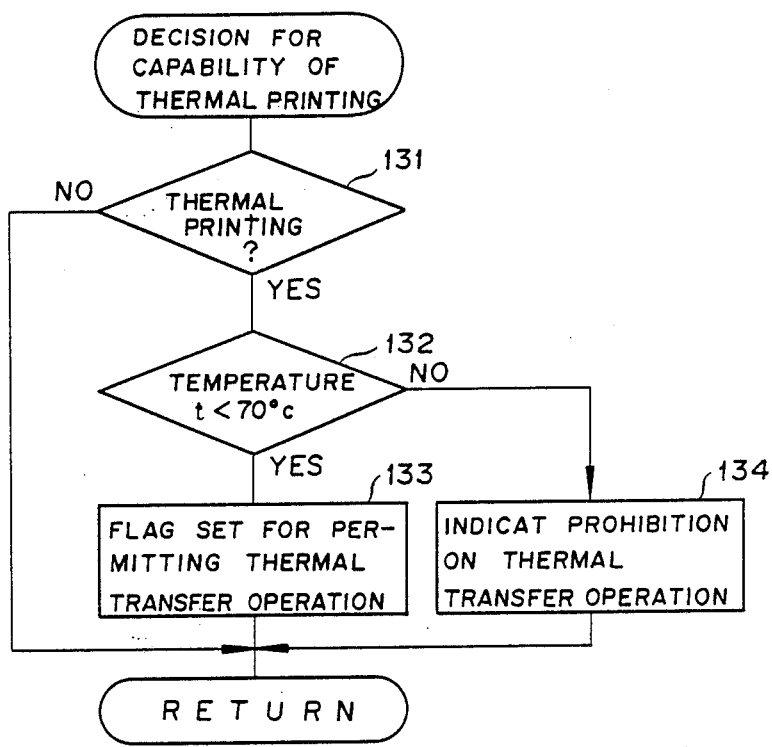
FIG. 12 is a flow chart showing in detail the step for judging the readiness of the apparatus for image formation shown in FIG. 10.

FIG. 10 to FIG. 12 are flow charts indicating the procedures of control contemplated by this embodiment.

When a main power source switch installed on the main body of the apparatus is turned ON, the initial setting is effected at the Step 101 as illustrated in FIG. 10. By this initial setting, a standard mode is set for the control of the parts used in common for all types of units, a decision is made as to which type unit has been installed in the main assembly, and the members ir the main body of the apparatus including those in the unit are set in an operative state. Then, at the Step 102, the internal timer of the CPU 93 is set at the time for one routine required for various controls. At the Step 103, a decision is made as to whether or not the apparatus is capable of forming an image. When this decision is for an affirmative answer, the key input treatment is executed at the Step 104. Then the treatment of data for the display part 95, the control for the formation of an image, and other treatments are executed at the Step 105. When the termination of internal timer is detected at the Step 106, the processing is returned to the Step 102. When the decision made at the Step 103 draws a negative answer, the display of abnormality, etc. are executed at the Step 107. The state cf abnormality is exhibited in the display part 95 at the Step 105.

FIG. 11 illustrates in detail the initial setting subroutine at the Step 101. First, at the Step 111, the initial value of the CPU 93 is reset and the flags F1, F2 for discerning which of the first unit 25 and the second unit 50 has been installed in the main assembly are reset to "0."

In the illustrated embodiment, two microswitches 71a, 71b are installed as illustrated in FIG. 6 and they are turned ON or OFF to designate the kind among three kinds of unit. One of them is the first unit possessed of the electrophotographic copying function illustrated in FIG. 1, another of them is the second unit provided with the image reader (IR) 56 illustrated in FIG. 2 and possessed of the thermal transfer printing function, and the remainder in the second unit 50 of modified type not possessed of the image reader.

Either of the flags F1, F2 is set at the Step 112, depending on the kind of unit installed in the main body 26.

When the flag F1 is set at "1" and the flag F2 is kept reset at "0" this combination signifies that the first unit 25 has been installed. When the flag F1 is kept reset at "0" and the flag F2 is set at "1," this combination signifies that the second unit 50 of the modified type, namely the unit possessed of no image reader 56, has been installed. When the two flags F1, F2 are each set at "1," this combination signifies that the second unit illustrated in FIG. 2, namely the second unit 50 possessed of the image reader 56, has been installed.

Next, at the steps 113 to 129, operation of each element of the apparatus is permitted or prohibited in accordance with the type of the installed unit as shown in the following table. In the table, "ON" means that the indicated operation is permitted and "OFF" means that the operation is prohibited. Since the members in the main body 26 of the apparatus are adapted to be controlled as described above, when there is carried out any opreation other than the copying operation by the electrophotographic method, any action unnecessary for that particular operation is prohibited and the otherwise possible waste of electric power is precluded.

The Step 130 is meant for the initial setting in the other members mentioned above. When this step is completed, the processing returns to the main routine illustrated in FIG. 10.

decision as to the temperature of the fixing device 40 is made at the Step 132. Generally, it is on the upper roller 76 that the fixing device 40 comes into contact with the transferred image surface of the paper. The decision mentioned above, therefore, is accomplished by detecting the surface temperature of the upper roller 76 with the thermistor 96 illustrated in FIG. 9 and determining whether or not the surface temperature is less than 70° C. which is the melting point of the ink.

The flag indicating a permit for the thermal transfer operation is set at the Step 133 when the temperature of the fixing device 40 is less than the melting point of the ink. When the temperature of the fixing device 40 is found to exceed 70° C., the thermal transfer operation is prohibited and a warning such as "WAIT" is displayed at the Step 134. The processing is returned to the main routine and the operations mentioned above are repeated and the apparatus is kept waiting for the temperature to fall below 70° C. When the temperature falls below the level mentioned above, the flag of permit is set and the displayed warning is turned off at the Step 133. Since the melting point of the ink is variable with the kind of the ink, the temperature as the level for the aforementioned decision can be freely changed as required.

FIG. 13 to FIG. 16 illustrate typical image forming apparatus as other embodiments of the present invention. In these diagrams, the members which are the same as in the embodiments described above are denoted by same symbols.

In the embodiments illustrated in FIG. 1 to FIG. 5,

TABLE

| TYPE OF UNIT | FLAG | CHARGERS 32, 35 | FIXING DEVICE 40 | LIGHT SOURCE 29 | SCANNING ORIGINAL | EXHAUST FAN 46 |
| --- | --- | --- | --- | --- | --- | --- |
| FIRST UNIT | F1 = 1 F2 = 0 | ON | ON | ON | ON | ON |
| SECOND UNIT | F1 = 0 F2 = 0 | OFF | OFF | OFF | OFF | OFF |
| SECOND UNIT WITH IMAGE READER | F1 = 1 F2 = 1 | OFF | OFF | ON | ON | OFF |

There are times when the main body of the apparatus is loaded with the second unit 50 immediately after the copying operation by the electrophotographic process is completed with the apparatus loaded with the first unit 25. Since the fixing device 40 is still at an elevated temperature immediately after the completion of the copying operation, there is a possibility that the thermally fusible ink transferred from the ink ribbon 51 to the paper by the thermal head 54 will be melted out. When the ink is melted out, the molten ink is suffered to adhere to the roller 76 of the fixing device 40. For the purpose of preventing this trouble, the decision to be made as to the readiness of the apparatus for image formation at the Step 103 in FIG. 10 includes the control illustrated in FIG. 12 so that the operation for image formation by the use of the second unit 50 is prohibited, when the temperature of the fixing device 40 which is exposed to the image surface of the paper exceeds the melting point of the ink which is generally in the neighborhood of 70° C. (158° F.) and this fact is indicated on the display part 95 on the operation panel.

First at the Step 131, a decision is made as to whether or not the printing operation by the use of the thermal head is to be performed as illustrated in FIG. 12. When the main body of the apparatus is loaded with the second unit 50 or its modified type and the printing operation is performed by the use of the thermal head 54, the the platen roller 55 is depicted as installed in the second unit 50. In the present embodiment, the platen roller 55 is adapted to be attached to the lower body 26a and the platen roller 55 and the transfer charger 35 are moved to their operating positions, depending on the kind of unit to be installed.

Figure 15:
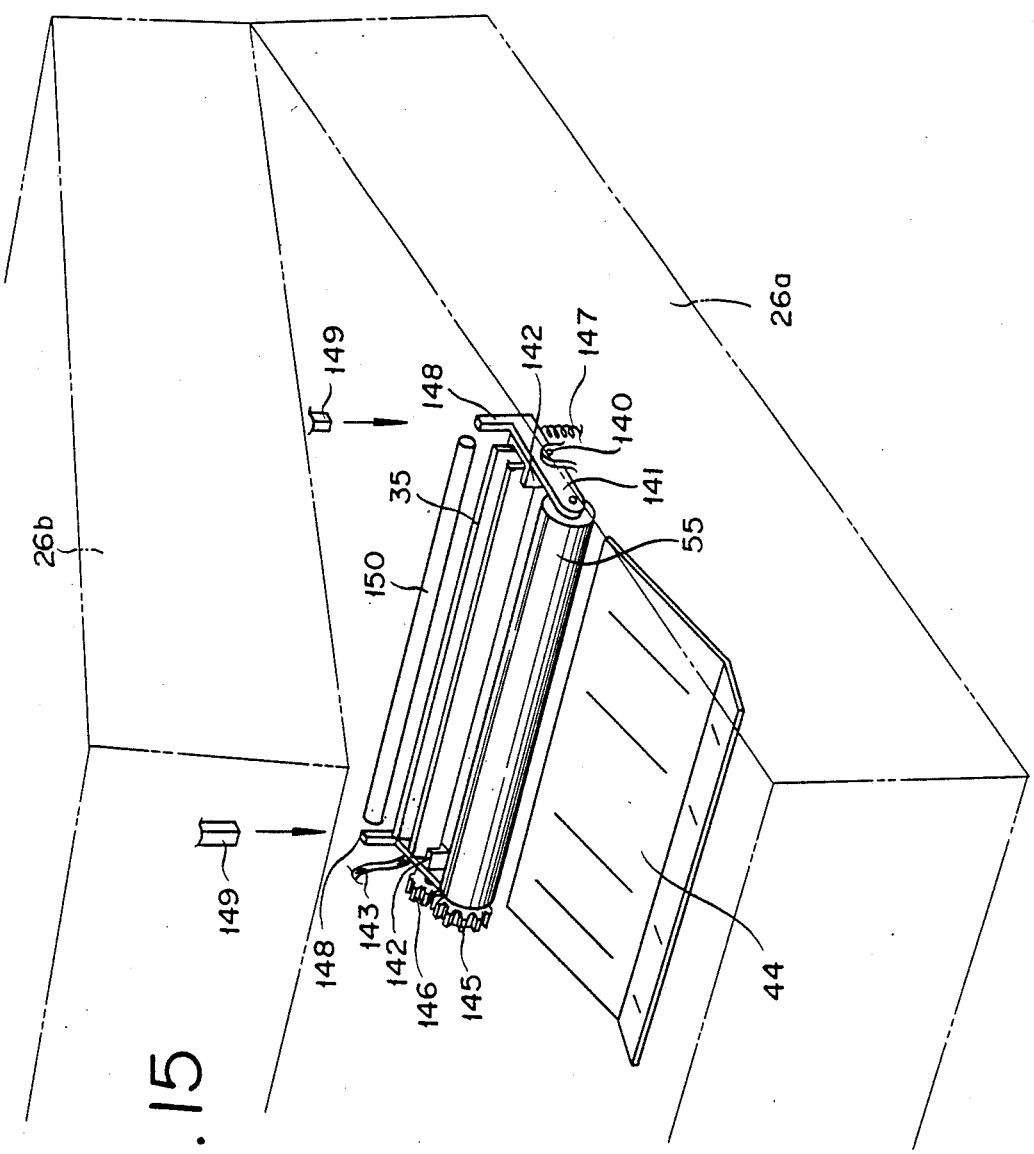
FIG. 15 is a perspective view illustrating as magnified part of the platen roller and the transfer charger of the image forming apparatus shown in FIG. 13 and FIG. 14.
Figure 16:
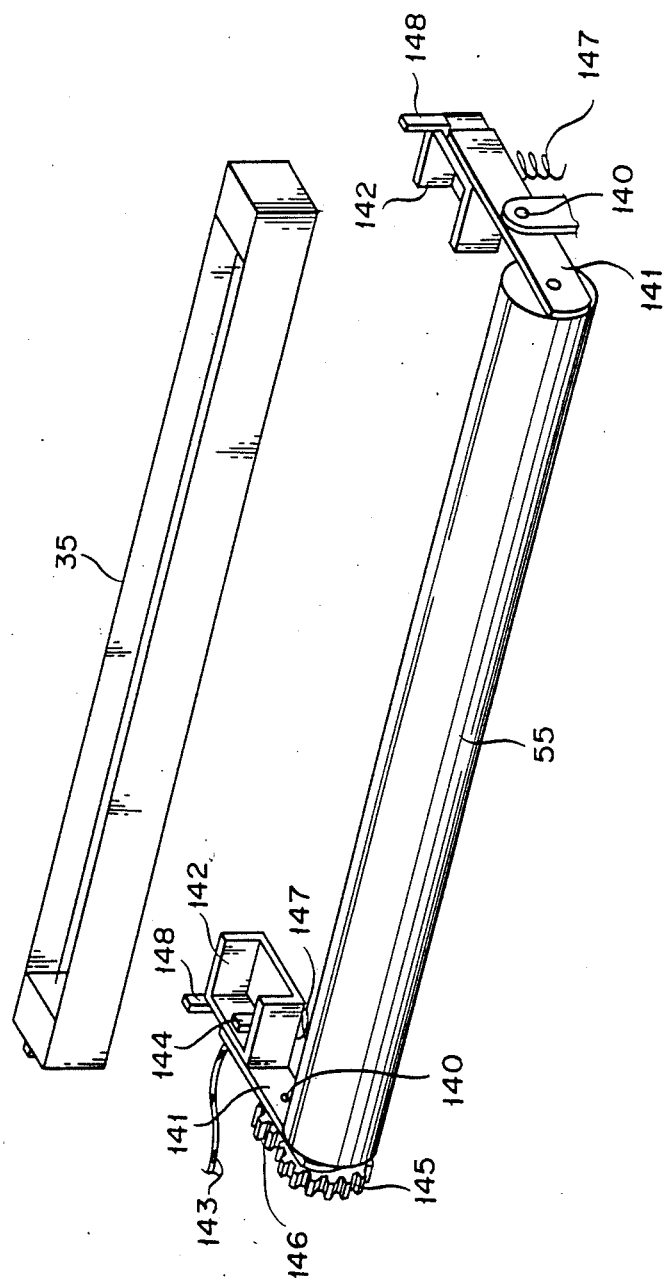
FIG. 16 is an exploded perspective view illustrating in detail the members shown in FIG. 15.

A pair of swinging arms 141 are swingably attached in their middle parts to pins fixed on the lower body 26a as illustrated in FIG. 15 and FIG. 16. The platen roller 55 is attached rotatably to one terminal part each of the swinging arms 141. Supporting brackets 142 for supporting the opposite end parts of the transfer charger 35 are attached to the other terminal parts of the swinging arms 141. One of the supporting brackets 142 is provided with a voltage applying terminal 144 which is connected to a power source card 143. The platen roller 55 is provided at one terminal part thereof with a toothed wheel 145 as illustrated in FIG. 15 and FIG. 16. A toothed wheel 146 meshed with the toothed wheel 145 is attached to the swinging arm 141 as disposed coaxially with the pin 140. By a motor (not shown), the toothed wheel 146 is driven to impart a rotation to the platen roller 55 through the medium of the toothed wheel 145.

Figures 13, 14:
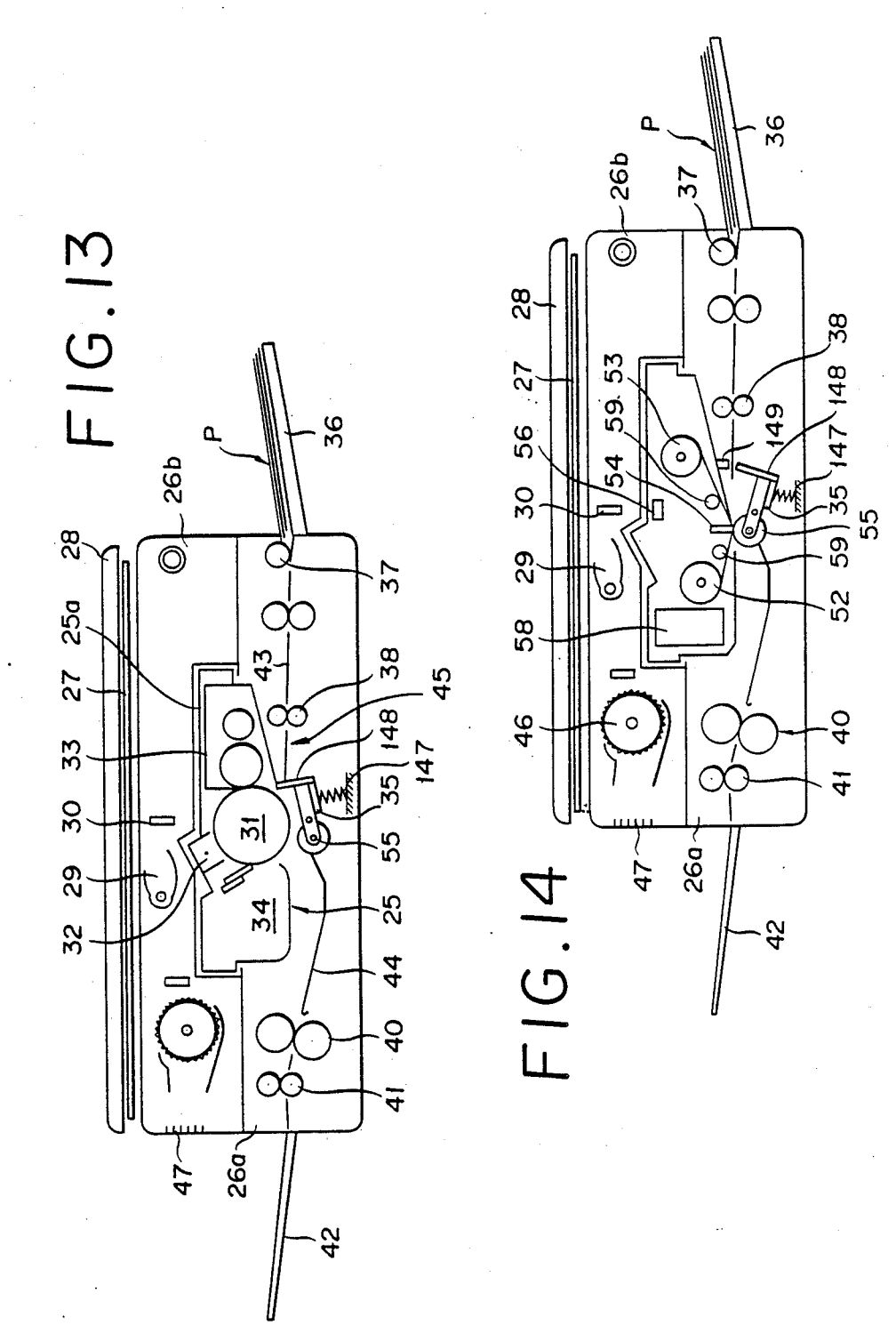

Inside the lower body 26a, a compressive coil spring 147 adapted to exert a resilient force tending to push the supporting brackets 142 upwardly is set in place. When the main body 26 of the apparatus is loaded with the first unit 25 as illustrated in FIG. 13, the spring 147 rotates the swinging arm 141 counterclockwise, approximates the transfer charger 35 to the photosensitive drum 31, and moves the platen roller 55 downwardly. As the result, the platen roller 55 functions as a conveyor roller for transporting the paper onto which the image has been transferred.

The swinging arms 141 are each provided at the aforementioned other terminal part thereof with a part 118 projecting upwardly. The second unit 50 is provided with a projection 149 adapted to collide with the part 148. When the upper body 26b of the apparatus in a state loaded with the second unit 50 is closed as illustrated in FIG. 14, the part 148 is depressed by the projection 149 and the swinging arm 141 is rotated clockwise. As the result, the platen roller 55 is pressed against the thermal head 54 and the transfer charger 35 is separated from the photosesitive drum 31 as illustrated in FIG. 14. FIG. 15 illustrates the guide plate 44 disposed on the downstream side of the platen roller 55 and the guide roller 150 disposed on the upstream side of the transfer charger 35. Also in the present embodiment, the apparatus is controlled in the procedure illustrated in FIG. 10 to FIG. 12.

Figure 19:
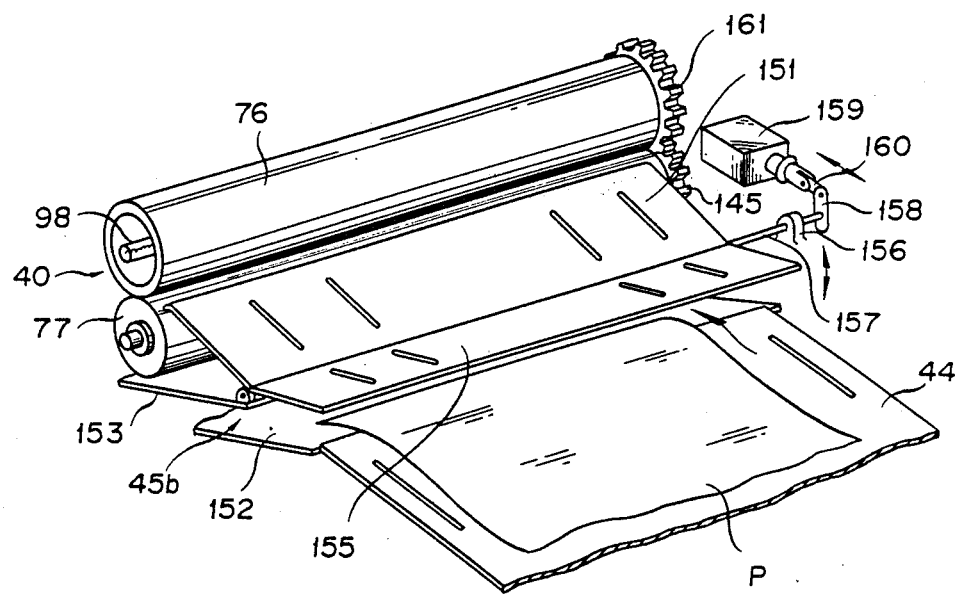
FIG. 19 is a perspective view illustrating the paper transport path and the branching part shown respectively in FIG. 17 and FIG. 18.

FIG. 17 to FIG. 19 illustrate a typical image forming apparatus as a further embodiment of this invention. In these diagrams, the members which are the same as in the embodiments described above are denoted by same symbols.

In the image forming apparatus of each of the embodiments described above, when the apparatus is loaded with the second unit 50 and is operated to print the image by the thermal transfer printing process, the heater lamp 78 of the fixing device 40 is turned OFF and the pressing force of the two rollers 76, 77 is decreased or nullified. In the present embodiment, the paper is not passed through the fixing device 40 but is caused to detour it.

In the lower body 26a, a guide plate 151 for guiding the paper in the direction of the fixing device 40 is disposed on the downstream side of the guide plate 44 which is located on the downstream side of the transfer charger 35. This guide plate 151 and the aforementioned guide plate 44 jointly form a first paper transport path 45a for guiding the paper to the fixing device 40. On the downstream side of the guide plate 44, a guide plate 152 inclined downwardly and extended to the paper discharge tray 42 is disposed. A guide plate 153 is above the guide plate 152 as laid parallelly thereto. These guide plates 152, 153 give rise to a bypass paper transport path branching off the first paper transport path 45a and caused to detour the fixing device 40, namely a second paper transport path 45b. This second paper transport path 45b is provided with a pair of paper discharge rollers 154 for advancing the papers received therein to the paper discharge tray 42.

To the branching part, a switching plate 155 is swingably attached to permit choice between the first paper transport path 45a and the second paper transport path 45b for guiding the paper, depending on the kind of unit to be, installed in the main body of the apparatus. This switching plate 155 is swung to the first position for closing the second paper transport path 45b and guiding the paper to the fixing device 40 as illustrated in FIG. 17 or to the second position for opening the second paper transport path 45b as illustrated in FIG. 18.

In order for the switching plate 155 to be swung, this switching plate 155 is attached to a shaft 157 rotatably supported on a bearing 156 as illustrated in FIG. 19, a link 158 is fixed at one end of the shaft 157, and a link 160 adapted to be reciprocated by a solenoid 159 is connected to the link 158. When the main body is loaded with the second unit 50, therefore the switching plate 155 is swung upwardly as illustrated in FIG. 18 and the paper P is guided to the second paper transport path 45b by the actuation of the solenoid 159. To the terminal part of the upper roller 76 of the fixing device 40, a toothed wheel 161 adapted to be meshed with the toothed wheel 145 disposed at the terminal part of the lower roller 77 is attached.

This image forming appratus has no use for the control illustrated in FIG. 12. The heater lamp 78 incorporated in the upper roller 76 of the fixing device 40 is not energized when the main body is loaded with the second unit 50 similarly to the embodiments described above.

The image forming apparatus of this invention described above is enabled to serve as a printer when the second unit 50 possessing the function of a thermal transfer printer is incorporated in the place of the first unit 25 possessing the fucntion of a copying machine. This apparatus permits free selection between the function of an analog copying machine enjoying high resolution and the function of a digital thermal transfer printer of low running cost. Since various members such as the mechanism for paper transport paths can be used in common for the first and second units, this invention permits inexpensive production of an apparatus combining these two functions.

What is claimed is:

1. An image forming apparatus, comprising:
   a main assembly incorporating therein a paper transport mechanism for transporting a paper,
   a first unit and a second unit interchangeably set in place in said main assembly, said first unit including a photosensitive member and a processing device for copying an image on said paper by the electrophotographic copying process and said second unit including a thermal head and an ink ribbon transport device for transporting an ink ribbon carrying an ink thereon,
   wherein the formation of an image on said paper is effected by said first unit using said electrophotographic copying process or by said second unit, using thermal transfer printing process resorting to said thermal head and said ink ribbon.

2. An image forming apparatus according to claim 1, wherein said second unit is provided with an image reader for generating image data according to an original.

3. An image forming apparatus according to claim 2, wherein said image reader is electrically connected to said thermal head to transmit the image data thereto.

4. An image forming apparatus according to claim 1, wherein said thermal head in said second unit is adapted to be electrically connected to an external device to form an image on said paper in accordance with image data from said external device.

5. An image forming apparatus, comprising:
   a main assembly incorporating therein a paper transport mechanism for transporting a paper, a first unit and a second unit interchangeably set in place in said main assembly, said first unit including a photosensitive member and serving the purpose of forming an image on said paper by the electrophotographic copying process and said second unit including a thermal head and an ink ribbon transport device for transporting an ink ribbon carrying an ink thereon and serving the purpose of forming an image on said paper by the thermal transfer printing process, processing means disposed along said paper transport path and adapted to carry out the electrophotographic copying process in cooperation with said first unit, detecting means for making a decision as to whether said main assembly is loaded with said first unit or with said second unit, and control means adapted to prohibit the operation of said processing means in response to the operation of said detecting means when said main assembly is loaded with said second unit.

6. An image forming apparatus according to claim 5, wherein said processing means is provided with a fixing device incorporating therein a heater and a transfer charger for transferring a toner image adhering to said photosensitive member onto said paper and, when said main assembly is loaded with said second unit, said control means prohibits the operation of said heater and that of said transfer charger.

7. An image forming apparatus, comprising:

a main assembly incorporating therein a paper transport mechanism for transporting a paper, a first unit and a second unit interchangeably set in place in said main assembly, said first unit including a photosensitive member and a developing device for forming a toner image on said photosensitive member and serving the purpose of forming an image on said paper by the electrophotographic copying process and said second unit including a thermal head and an ink ribbon transport device for transporting an ink ribbon carrying an ink thereon and serving the purpose of forming an image on said paper by the thermal transfer printing process, fixing means disposed on said paper transport path and adapted to fix said toner image on said paper by means of heat, detecting means for making a decision as to whether said main assembly is loaded with said first unit or with said second unit, and control means adapted to control said fixing means in response to the decision by said detecting means.

8. An image forming apparatus according to claim 7, wherein said fixing means is provided with a heater and said heater is adapted to be deenergized when said main assembly is loaded with said second unit.

9. An image forming apparatus, comprising:

a main assembly incorporating therein a paper transport mechanism for transporting a paper, a first unit and a second unit interchangeably set in place in said main assembly, said first unit including a photosensitive member and a developing device for forming a toner image on said photosensitive member and serving the purpose of forming an image on said paper by the electrophotographic copying process and said second unit including a thermal head and an ink ribon transport device for transporting an ink ribbon carrying an ink thereon and serving the purpose of forming an image on said paper by the thermal transfer printing process, fixing means disposed on said paper transport path and adapted to fix said toner image on said paper by means of heat, sensor means for detecting the temperature of said fixing means, and control means adapted to prohibit the operation of said second unit when the temperature of said fixing means is higher than the melting point of said ink.

10. An image forming apparatus, comprising:

a main assembly incorporating therein a paper transport mechanism for transporting a paper, a first unit and a second unit interchangeably set in place in said main assembly, said first unit including a photosensitive member and a developing device for forming a toner image on said photosensitive member and serving the purpose of forming an image on said paper by the electrophotographic copying process and said second unit including a thermal head and an ink ribbon transport device for transporting an ink ribbon carrying an ink thereon and serving the purpose of forming an image on said paper by the thermal transfer printing process, a pair of fixing rollers disposed on said paper transport path and adapted to fix said toner image on said paper by means of heat, and means for reducing the pressing force of said fixing rollers in response to the attachment of said second unit to said main assembly.

11. An image forming apparatus, comprising:

a main assembly, a first unit and a second unit interchangeably set in place in said main assembly, said first unit including a photosensitive member and a developing device for forming a toner image on said photosensitive member and serving, the purpose of forming an image on a paper by the electrophotographic copying process and said second unit including a thermal head and an ink ribbon transport device for transporting an ink ribbon carrying an ink thereon and serving the purpose of forming an image on a paper by the thermal transfer printing process, fixing means disposed in said main assembly for fixing said toner image on said paper by means of heat, paper transport means for transporting a paper, said paper transport means including a first paper transport path passing through said fixing means and a second paper transport path bypassing said fitting means, control means for controlling said paper &transport means so that the paper passes through said first paper transport path when said main assembly is loaded with said first unit or the paper passes through said second paper transport path when said main assembly is loaded with said second unit.

12. An image forming apparatus according to claim 11, which further comprises a switching plate disposed at a branching part between said first paper transport path and said second paper transport path and adapted to close said second paper transport path when said main assembly is loaded with said first unit or open said second paper transport path when said main assembly is loaded with said second unit.

13. An image forming apparatus comprising:

a main assembly including a paper transport path for transporting a paper;

a first unit and a second unit interchangeably set in place in said main assembly, said first unit including a photosensitive member and a developing device for forming a toner image on said photosensitive member and serving the purpose of forming an image on a paper by the electrophotographic copying process and said second unit including a thermal head and an ink ribbon transport device for transporting an ink ribbon carrying an ink thereon and serving the purpose of forming an image on a paper by thermal transfer printing process;

transfer means movably disposed in said main assembly and adapted to transfer the toner image from said photosensitive member onto the paper;

platen means movably disposed in said main assembly and adapted to support the paper opposite said thermal head, and means for moving said transfer means and said platen means in response to the attachment operation of the respective units.

14. An image forming apparatus according to claim 13, wherein said platen roller is attached to one terminal of a swinging member disposed swingably in said main assembly and a transfer charger attached to the other terminal of said swinging member, said swinging member is swung by contacting with either one of said first and second units.

* * * * *

UNITED STATES PATENT AND TRADEMARK OFFICE
CERTIFICATE OF CORRECTION

PATENT NO. : 4,939,541

DATED : July 3, 1990

INVENTOR(S) : Mitsushi Sugiura

It is certified that error appears in the above-identified patent and that said Letters Patent is hereby corrected as shown below:

In the drawings, Sheet 1, FIG. 2, change "26a" to --26b--, and change "26b" to --26a--.

In the drawings, Sheet 2, FIG. 3, change reference number "38" directed to the paper feed tray (on the far right-hand side of the FIG.) to --36--.

In the drawings, Sheet 4, FIG. 6, change "26a" to --26b--.

In the drawings, Sheet 6, FIG. 9, change "CHAGER" in box 35 to --CHARGER--, and change "IMAG" to --IMAGE-- above the arrow between boxes 54 and 93.

In the drawings, Sheet 7, FIG. 10, in diamond 103, change "POSSIPLE" to --POSSIBLE--.

In the drawings, Sheet 8, FIG. 11, in box 117, change "FOF" to --FOR--.

In the drawings, Sheet 9, FIG. 12, in box 134, change "INDICAT" to --INDICATE--.

UNITED STATES PATENT AND TRADEMARK OFFICE
CERTIFICATE OF CORRECTION

PATENT NO. : 4,939,541

DATED : July 3, 1990

INVENTOR(S) : Mitsushi Sugiura

It is certified that error appears in the above-identified patent and that said Letters Patent is hereby corrected as shown below:

In col. 1, line 8, change "interchageably" to --interchangeably--.

In col. 4, line 35, change "electtrostatic" to --electrostatic--.

In col. 5, line 7, change "piont" to --point--.

In col. 5, line 48, change "othe" to --the--.

In col. 5, line 51, after "motor", insert --(--.

In col. 8, line 4, change "illustrate" to --illustrated--.

In col. 8, line 8, change "&:his" to --this--.

In col. 8, line 22, after "reading", change "a" to --an--.

In col. 8, line 38, change "ir" to --in--.

In col. 9, line 24, change "opreation" to --operation--.

In col. 10, line 60, change "card" to --cord--.

UNITED STATES PATENT AND TRADEMARK OFFICE
CERTIFICATE OF CORRECTION

PATENT NO. : 4,939,541

DATED : July 3, 1990

INVENTOR(S) : Mitsushi Sugiura

It is certified that error appears in the above-identified patent and that said Letters Patent is hereby corrected as shown below:

In col. 11, line 14, change "118" to --148--.

In col. 11, line 22, change "photosesitive" to --photosensitive--.

In col. 12, line 27, change "fucntion" to --function--.

In col. 13, line 67 (claim 9, line 11), change "ribon" to --ribbon--.

In col. 14, line 30 (claim 10, line 19), change "tc" to --to--.

In col. 14, line 38 (claim 11, line 7), delete "," (comma).

In col. 14, line 50 (claim 11, line 19), change "fitting" to --fixing--.

In col. 14, line 52 (claim 11, line 21), delete "&".

Signed and Sealed this

Eighth Day of October, 1991

*Attest:*

HARRY F. MANBECK, JR.

*Attesting Officer*     *Commissioner of Patents and Trademarks*